(12) United States Patent
Gregory

(10) Patent No.: US 10,233,919 B2
(45) Date of Patent: Mar. 19, 2019

(54) DUAL COMPLETION LINEAR ROD PUMP

(71) Applicant: Benjamin J. Gregory, Racine, WI (US)

(72) Inventor: Benjamin J. Gregory, Racine, WI (US)

(73) Assignee: Unico, LLC, Franksville, WI (US)

( * ) Notice: Subject to any disclaimer, the term of this patent is extended or adjusted under 35 U.S.C. 154(b) by 181 days.

(21) Appl. No.: 15/171,501

(22) Filed: Jun. 2, 2016

(65) Prior Publication Data

US 2016/0363116 A1 Dec. 15, 2016

Related U.S. Application Data

(60) Provisional application No. 62/173,596, filed on Jun. 10, 2015.

(51) Int. Cl.

| | | |
|---|---|---|
| *E21B 43/12* | (2006.01) | |
| *F04B 23/06* | (2006.01) | |
| *F04B 41/06* | (2006.01) | |
| *F04B 47/02* | (2006.01) | |
| *F04B 49/06* | (2006.01) | |
| *F04B 51/00* | (2006.01) | |
| *F16H 19/04* | (2006.01) | |
| *F04B 17/03* | (2006.01) | |

(52) U.S. Cl.
CPC ............ *F04B 47/02* (2013.01); *E21B 43/126* (2013.01); *F04B 17/03* (2013.01); *F04B 23/06* (2013.01); *F04B 47/026* (2013.01); *F04B 49/065* (2013.01); *F04B 51/00* (2013.01); *E21B 43/127* (2013.01); *F04B 41/06* (2013.01); *F04B 47/022* (2013.01); *F16H 19/04* (2013.01)

(58) Field of Classification Search
CPC ........ F04B 47/00; F04B 47/02; F04B 47/026; F04B 17/03; F04B 23/06; F04B 41/06; F04B 47/022; E21B 43/126; E21B 43/127; F16H 19/04
See application file for complete search history.

(56) References Cited

U.S. PATENT DOCUMENTS 2,910,002 A * 10/1959 Morgan ................. E21B 43/14
166/105.5
5,873,411 A    2/1999 Prentiss
(Continued)

*Primary Examiner* — Alexander B Comley
(74) *Attorney, Agent, or Firm* — Reinhart Boerner Van Deuren P.C.

(57) ABSTRACT

A dual completion linear rod pumping apparatus for imparting reciprocating vertical motion to a pair of rods for respective sucker-rod pumps. The dual completion linear rod pumping apparatus includes first and second linear mechanical actuator systems disposed in a single housing. These linear mechanical actuator systems impart and control vertical motion of the pair of rods. Each linear mechanical actuator system includes a rack and pinion gearing arrangement. The rack is operatively connected in a gear-mesh relationship with the pinion. The pinion is operatively connected to a rotating output of a motor. Rotation of the motor in a first direction results in an upward motion of the rack and connected sucker rod pump. Rotation of the motor in a second direction opposite the first direction results in a downward motion of the rack and connected sucker rod pump. An electronic controller is operatively connected to the motor.

13 Claims, 8 Drawing Sheets

(56) References Cited

U.S. PATENT DOCUMENTS

| | | |
|---|---|---|
| 7,168,924 B2 | 1/2007 | Beck et al. |
| 8,152,492 B2 | 4/2012 | Beck et al. |
| 8,641,390 B2 | 2/2014 | Beck et al. |
| 2009/0000790 A1 | 1/2009 | Bertane |
| 2012/0177504 A1* | 7/2012 | Beck ................. F04B 47/02 417/44.1 |
| 2014/0219819 A1 | 8/2014 | Roman et al. |

* cited by examiner

DUAL COMPLETION LINEAR ROD PUMP

CROSS-REFERENCE TO RELATED PATENT APPLICATIONS

This patent application claims the benefit of U.S. Provisional Patent Application No. 62/173,596, filed Jun. 10, 2015, the entire teachings and disclosure of which are incorporated herein by reference thereto.

FIELD OF THE INVENTION

This invention generally relates to systems and methods for the pumping of fluids, such as water and/or hydrocarbons, from subterranean formations or reservoirs, and more particularly to a pumping apparatus and method for use in such pumping applications.

BACKGROUND OF THE INVENTION

In many conventional types of pumping systems used in a drilling apparatus, controlling and optimizing the performance of a sucker-rod pumping apparatus involves inherent difficulties. One factor which must be taken into account is the stretching of the rod string, which occurs during the upward portion of each pump stroke, and the corresponding contraction of the rod string which occurs during the downward portion of each pump stroke. The rod string, which may be about 1000 feet or 305 meters, or longer, acts much like an extension spring, which is stretched during the portion of the pump stroke in which the rod string is drawing the fluid upward within the well, and which then contracts back to an essentially un-stretched state as the rod string moves downward during a return portion of the pump stroke. As a result of the rod stretch, an above-ground upward stroke of about 32 inches, or 82 cm, for a well approximately 1300 feet, or 396 meters, deep, may only result in a down-hole stroke in the range of 24 to 26 inches, or 61 to 66 cm, for example. The difference between the magnitude and direction of movement of the polished rod at the top of the well and the corresponding reaction of the rod string and down-hole stroke of the pump involves other complicating factors, including inherent damping within the rod string, fluid damping which occurs during the pump stroke and longitudinal vibrations and natural frequencies of the rod string.

The problems associated with effectively and efficiently operating a sucker-rod pump apparatus are addressed in significantly greater detail in a commonly assigned U.S. Pat. No. 7,168,924 B2, to Beck et al., titled "Rod Pump Control System Including Parameter Estimator", the entire teachings and disclosure of which is incorporated herein by reference thereto. The Beck et al. patent also discloses a rod pump control system, which includes a parameter estimator that determines, from motor data, parameters relating to operation of the rod pump and/or generating a down-hole dynamometer card, without the need for external instrumentation such as down-hole sensors, rod load sensors, flow sensors, acoustic fluid level sensors, etc. In some embodiments disclosed by Beck et al., having a pumping apparatus driven by an electric motor, instantaneous current and voltage, together with pump parameters estimated through the use of a computer model of the sucker-rod pump, are used in determining rod position and load. The rod position and load are used to control the operation of the rod pump to optimize operation of the pump. Beck et al. also discloses a pump-stroke amplifier that is capable of increasing pump stroke without changing the overall pumping speed, or in the alternative, maintaining the well output with decreased overall pumping speed.

The inherent difficulties of operating a sucker-rod pump apparatus may also be compounded by the type of pumping apparatus, such as the typical walking-beam-type apparatus. The problems encountered when using these conventional pumping systems serve as ample evidence of the desirability of providing a new and improved pumping apparatus for use with a sucker-rod pump.

For example, conventional walking beam-type pumping mechanisms must typically be mounted on a heavy concrete foundation, which may be poured in place or pre-cast, located adjacent the well head. Construction of a walking beam pumping mechanism, together with its foundation, typically involves the efforts of several construction workers, over a period which may be a week or more, to prepare the site, lay the foundation, and allow time for the foundation to cure, in addition to the time required for assembling the various components of the walking beam mechanism onto the foundation and operatively connecting the mechanism to the polished rod.

Because of the costs of transporting the apparatus and the concrete or pre-cast foundation to what may be a remote site and the complexity of the site preparation and assembly process, walking beam-type pumping mechanisms are generally only utilized in long-term pumping installations. Further, the large size and massive weight of the walking beam pumping mechanism and its foundation may also problematic when the well is decommissioned. Economic and contractual obligations may require complete removal of the walking beam mechanism and its foundation.

Linear rod pumping systems have been developed to address a number of the above-described problems with conventional pumping systems. Linear rod pumping systems are disclosed in U.S. Pat. Nos. 8,152,492 and 8,641,390 both issued to Beck et al., and both titled "Linear Rod Pump Apparatus and Method", the entire teachings and disclosures of which are incorporated herein by reference thereto.

Embodiments of the present invention represent an advancement over the state of the art in pumping systems. These and other advantages of the invention, as well as additional inventive features, will be apparent from the description of the invention provided herein.

BRIEF SUMMARY OF THE INVENTION

In one aspect, the invention provides a dual completion linear rod pumping apparatus, for imparting reciprocating substantially vertical motion to a pair of rods for respective sucker-rod pumps. The dual completion linear rod pumping apparatus includes first and second linear mechanical actuator systems for imparting and controlling vertical motion of the pair of rods. The first and second linear mechanical actuator systems constructed to operate within a single housing. Each linear mechanical actuator system has a rack and pinion gearing arrangement. The rack is configured to impart a reciprocating motion along a pumping axis. The rack is operatively connected in a gear-mesh relationship with the pinion. The pinion is operatively connected to a rotating output of a motor, such that rotation of the motor in a first direction results in an upward motion of the rack along the pumping axis, and rotation of the motor in a second direction opposite the first direction results in a downward motion of the rack along the pumping axis. The rack is also operatively connected to the rod of the sucker-rod pump such that vertically-upward motion of the rack imparts a vertically upward motion to the rod of the sucker-rod pump, and such that the rod of the sucker-rod pump exerts a substantially vertically downward directed force on the rack, along the pumping axis, during a portion of a pump stroke. A motor has a reversibly rotatable element operatively connected to the pinion, which engages the rack to establish a fixed relationship between the rotational position of the pinion and the vertical position of the rack. An electronic controller is operatively connected to the motor, for controlling the motor. The electronic controller operates the motor in a driving mode to urge upward movement of the rack and of the rod, and operates the motor in a braking mode during downward movement of the rack on a downward portion of the stroke of the rod. The electronic controller includes one or more sensors for sensing at least one of linear position of the rack along the pumping axis, rotational position of the pinion about the pinion axis, motor torque, motor speed, motor acceleration, and motor input power.

In particular embodiments, the pair of rods are parallel to each other within the housing. In certain embodiments, the pair of rods is separated by no more than 6.86 inches (17.42 cm) center-to-center. More preferably, the pair of rods is separated by no more than 3.55 inches (9.02 cm) center-to-center.

In some embodiments, the rack of the first linear mechanical actuator system extends vertically, and the rack of the second linear mechanical actuator system extends vertically, the two racks being parallel and disposed within the housing. In a further embodiment, the racks of the first and second linear mechanical actuator systems each have a plurality of vertically-adjacent teeth along one side of the rack, the teeth of one rack facing away from the other rack, and facing 180 degrees from the direction faced by the gears of the other rack.

In certain embodiments, the motor of the first linear mechanical actuator system is disposed on a first exterior side of the housing, and the motor of the second linear mechanical actuator system is disposed on a second exterior side of the housing opposite the first exterior side. In some embodiments, the motor of the first linear mechanical actuator system operates independently of the motor of the second linear mechanical actuator system, a first sucker rod pump operates at a first depth in a first completion zone, and a second sucker rod pump operates at a second depth different from the first depth and in a second completion zone different from the first completion zone.

In another aspect, the invention provides a method for operating a dual completion linear rod pumping apparatus that includes first and second linear mechanical actuator systems each having a motor, and further includes rods for first and second sucker rod pumps. The method comprises constructing the first and second linear mechanical actuator systems to operate within a single housing. The method also includes operating each of the motors in a manner that imparts reciprocating vertical motion to respective vertically movable members of the first and second linear mechanical actuator systems. Each motor has a reversibly rotatable element that is operatively connected to the vertically movable member of its respective linear mechanical actuator system, thus establishing a fixed relationship between the rotational position of the rotatable element and the vertical position of the vertically movable member. Operating each of the motors includes imparting reciprocating vertical motion to each rod of the first and second sucker-rod pumps.

The method may also include operating the motor of the first linear mechanical actuator system independently of the motor of the second linear mechanical actuator system, and operating a first sucker rod pump at a first depth in a first completion zone, and operating a second sucker rod pump at a second depth different from the first depth and in a second completion zone different from the first completion zone. The method may further require independently controlling each motor in accordance with sensed values comprising at least one of linear position of the vertically movable member, rotational position of the rotatable element of the motor, motor torque, motor speed, motor acceleration, and motor input power.

In certain embodiments, the method calls for disposing the rod for the first linear mechanical actuator system, and the rod for the second linear mechanical actuator system, within the housing, and aligning the two rods such that they are parallel to each other. The method may include separating the rods by no more than 3.55 inches (9.02 cm) center-to-center.

The method may also include operating each of the motors in a manner that imparts reciprocating vertical motion to respective racks of the first and second linear mechanical actuator systems, each rack extending vertically and including a plurality of vertically-adjacent teeth. The method may further include aligning the two racks such that they are parallel to each other, and such that the teeth of one rack faces a first direction, and the teeth of the other rack faces a second direction 180 degrees from the first direction.

In a further embodiment, the method calls for sensing vertical position of each the two racks along a pumping axis, and controlling the respective motors according to the sensed vertical positions. In some embodiment, the method requires disposing the motor of the first linear mechanical actuator system on a first exterior side of the housing, and disposing the motor of the second linear mechanical actuator system on a second exterior side of the housing opposite the first exterior side.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
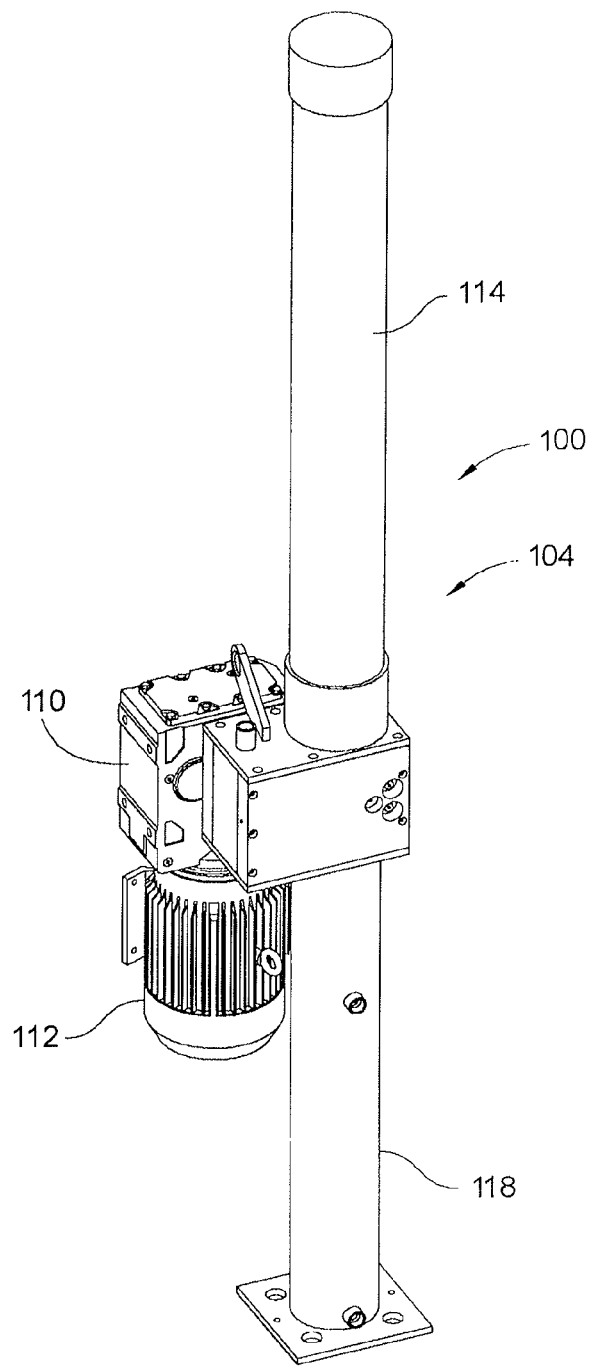
FIG. 1 is a perspective view of a linear rod pumping apparatus, of the type incorporated in an embodiment of the invention.
Figure 2:
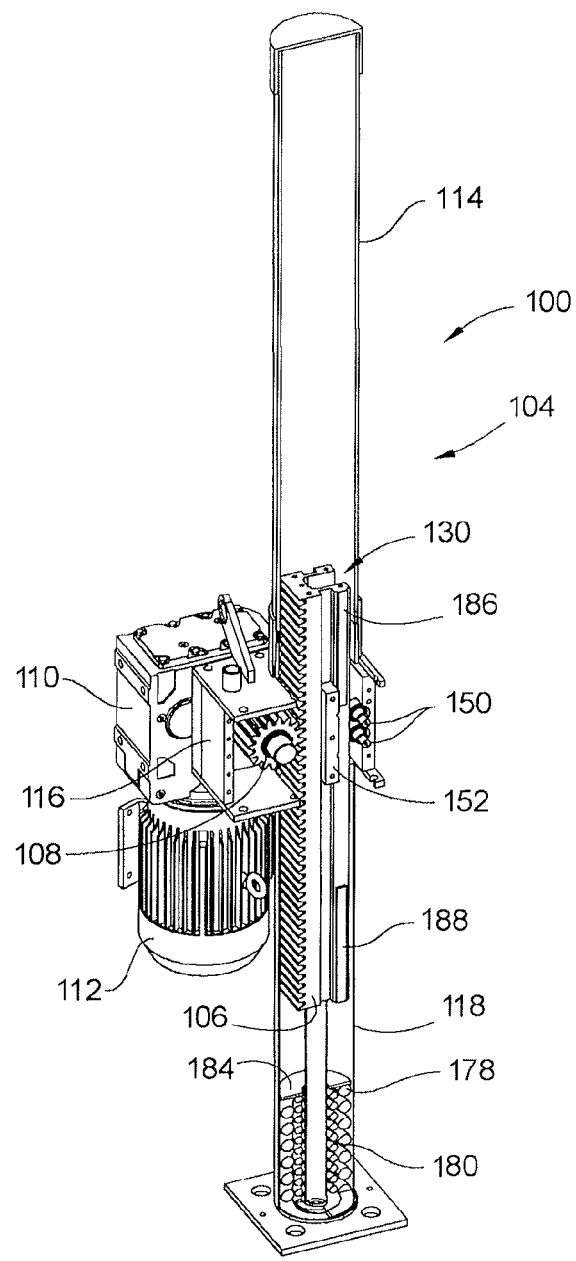
FIG. 2 is a partially cut-away perspective view of the linear rod pumping apparatus of FIG. 1.
Figure 3:
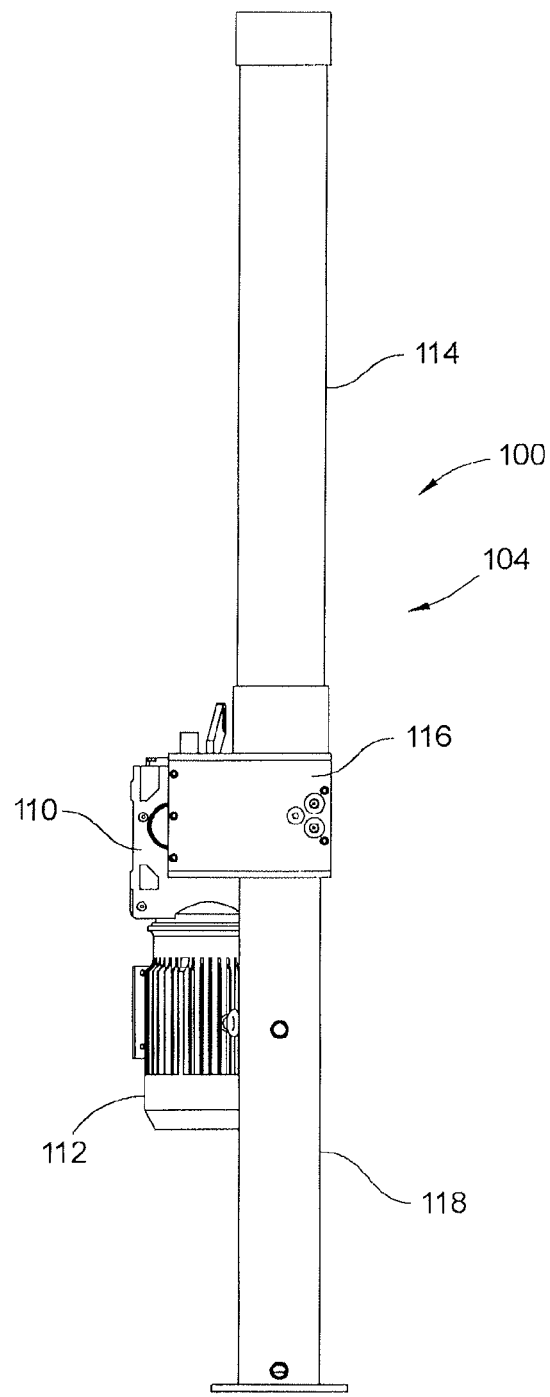
FIG. 3 is a orthographic illustration of the linear rod pumping apparatus of FIGS. 1 and 2, of the type incorporated in an embodiment of the invention.

FIGS. 1 and 2 show a perspective view and a perspective cross-sectional view, respectively, of a linear rod pumping apparatus 100, according an exemplary embodiment of the invention. FIG. 3 shows a plan view of the linear rod pumping apparatus 100. The linear rod pumping apparatus 100 includes a linear mechanical actuator system 104 which, in turn, includes a rack and pinion gearing arrangement having a rack 106 and a pinion 108 operatively connected through a gearbox 110 to be driven by a reversible electric motor 112 in a manner described in more detail below.

Figure 4:
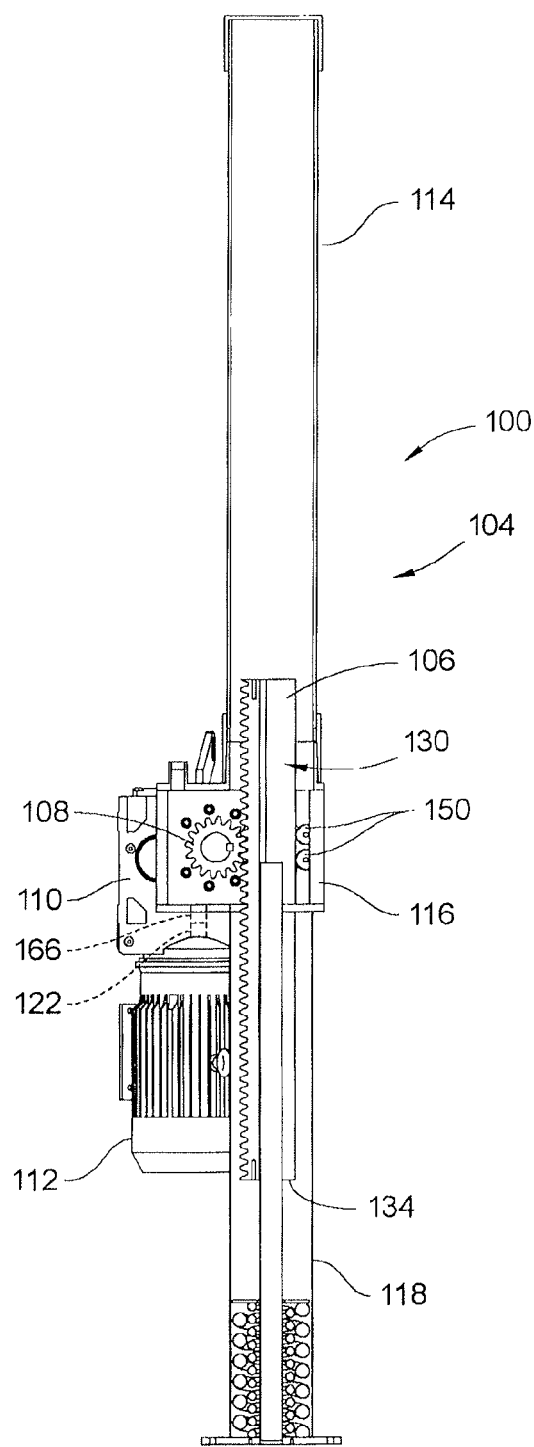
FIG. 4 is a partially cut-away perspective view of the linear rod pumping apparatus of FIG. 3.
Figure 5:
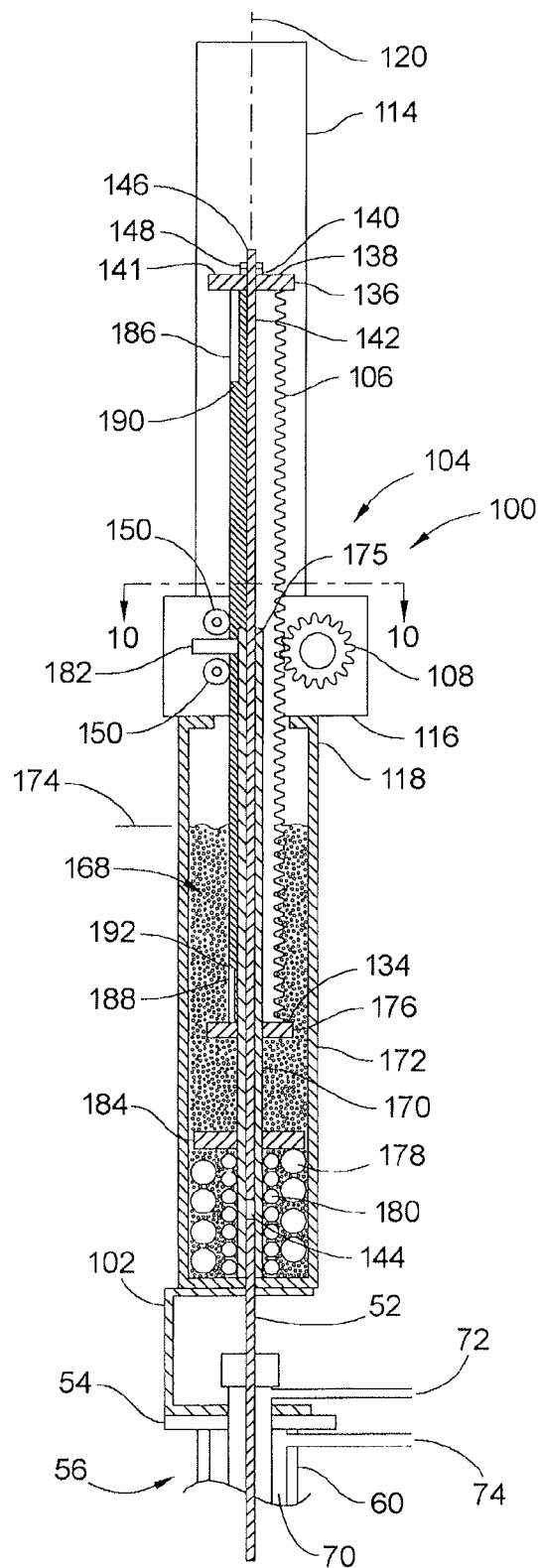
FIG. 5 is a schematic cross-sectional view of the linear rod pumping apparatus, of the type incorporated in an embodiment of the invention.

As shown schematically in FIGS. 2, 4, and 5, the linear mechanical actuator system 104 of the linear rod pumping apparatus 100 includes a rack and pinion gearing arrangement 106, 108 with the rack 106 being disposed for operation in a substantially vertical direction for reciprocating motion within a three piece housing having an upper, middle and lower section 114, 116, 118 along a substantially vertically oriented pumping axis 120. Four guide rollers 150 arranged in two pairs, are attached to the center section 116 of the housing substantially opposite the pinion 108, and configured to bear against the rack 106 to urge the rack 106 into a gear mesh relationship with the pinion 108. Two guide bars 152, substantially opposite from one another, operatively extend from a middle section 116 of the housing to urge the rack 106 into alignment with the pinion 108.

The rack 106 is operatively connected in gear mesh relationship with pinion 108 and the pinion 108 is operatively connected to a rotating output shaft 122 of the motor 112 such that rotation of the motor output shaft in a first direction is accompanied by a substantially vertically upward motion of the rack 106 along the pumping axis 120, and such that a substantially vertically downward motion of the rack 106 along the pumping axis 120 is accompanied by rotation of the motor output shaft 122 in a second direction opposite the first direction. The rack 106 is also operatively connected to the polished rod 52 of the sucker-rod pump 68 (shown in FIG. 8), such that the rack 106 cannot exert a substantially vertically downward directed force on the polished rod 52.

A longitudinally-directed channel 130 in the rack 106 extends along the pumping axis 120 from a lower end 134 of the rack 106 to a top end 136 of the rack 106, with the upper end 136 of the rack 106 being adapted for operative attachment thereto of the polished rod 52. Specifically, as shown in FIG. 5, the upper end 136 of the rack 106 includes a top plate 138 having a hole 140 extending therethrough and defining an upper load bearing surface 141 of the upper end 136 of the rack 106.

The linear mechanical actuator apparatus 104 of the linear rod pumping apparatus 100 includes an actuator rod 142, having a lower end 144 thereof fixedly attached to the top end of the polished rod 52 by a threaded joint or other appropriate type of coupling. The actuator rod 142 extends upward from the lower end 144, through the channel 130 in the rack 106 and the hole 140 in the top plate 138 of the rack 106, and terminates at and upper end 146 of the actuator rod 142 which is disposed above the bearing surface 141 on the upper surface of the top plate 138 of the rack 136. A rod clamp 148 is fixedly attached below the upper end 146 of the actuator rod 142 and above the upper end 136 of the rack 106. The clamp 148 has a lower load bearing surface thereof adapted for bearing contact with the upper load bearing surface 141 of the upper end 136 of the rack 106, for transferring force between the actuator rod 142 and the upper end 136 of the rack 106 when the lower load bearing surface of the clamp 148 is in contact with the upper load bearing surface 141 on the upper end 136 of the rack 106.

The clamp 148 forms an expanded upper end of the actuator rod 142 having a configuration that is incapable of entry into or passage through the hole 140 in the upper end 136 of the rack 106. It will be further appreciated that, to facilitate installation of the linear rod pumping apparatus 100 on a well head 54, the actuator rod 142 may be allowed to extend some distance beyond the collar 148, to thereby provide some measure of adjustment to accommodate variations in the positioning of the upper end of the polished rod 52, with respect to the lower end of the lower section 118 of the housing of the linear mechanical actuator system 104. As can be seen, the linear rod pumping apparatus 100 is mounted on a standoff 102 to the well head 54. The upper section 114, of the housing of the linear mechanical actuator system 104 includes sufficient head space to accommodate a portion of the actuator rod 142 extending above the clamp 148.

To further reduce the size of the linear rod pumping apparatus 100, the gearbox 110 is a right-angle gearbox having input element 166. In some embodiments, the input element 166 and the rotatable shaft 122 of motor 112 are oriented substantially parallel to the pumping axis 120. It will be understood that, in other embodiments of the invention, the motor 112 may be operatively attached to the pinion 108 by a variety of other means and in other relative orientations.

Figure 8:
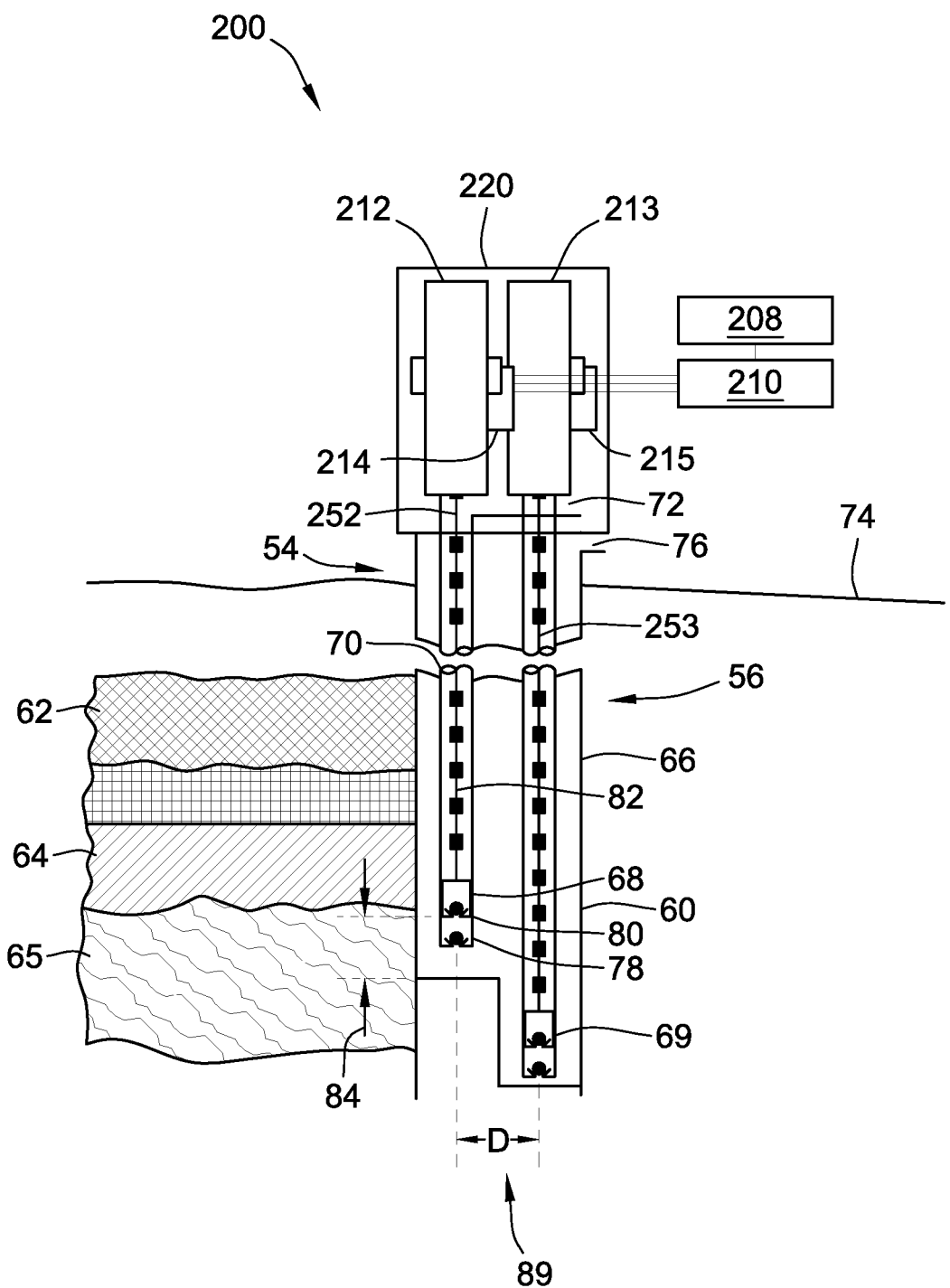
FIG. 8 is a schematic illustration of the dual completion linear rod pumping system mounted on the well head of a hydrocarbon well, according to an embodiment of the invention.

As best seen in FIG. 5, the linear mechanical actuator system 104, of the second exemplary embodiment 100 of the invention, also includes an oil sump 168, formed by the lower section 118 of the housing, and configured to contain a sufficient volume of lubricant therein, such that a lower portion of the rack 106 is immersed into the lubricant during at least a portion of each pump stroke 84 of the sucker-rod pump 68 (shown in FIG. 8). The sump 168 includes inner and outer longitudinally extending radially spaced tubular walls 170, 172 sealingly connected at lower ends thereof by the bottom end of the lower section 118 of the housing, to thereby define an annular-shaped cavity therebetween, for receipt within the cavity of the volume of the lubricant, and terminating in an annular-shaped opening between upper ends of the inner and outer tubular walls 170, 172.

As shown in FIG. 5, the inner tubular wall 170 extends substantially above a fluid level 174 of the lubricant within the sump 168, even when the rack 106 is positioned in a maximum downward location thereof, so that the lubricant is precluded from flowing over the top end 175 of the inner tubular wall 170. By virtue of this arrangement, it is not necessary to provide any sort of packing in the linear mechanical actuator system 104 between the lower end of the lower section 118 of the housing and the polished rod 52, or the actuator rod 142.

It will be noted, however, that in other embodiments of the invention, other arrangements for providing lubrication of the rack 106 in the sump 168 may be utilized, wherein it would be desirable to provide a packing between the rod 52, 142 and the lower end of the lower section 118 of the housing of the linear mechanical actuator system 104. In particular embodiments of the invention, it may be desirable to have the cross-sectional area of the sump 168 match the cross-sectional area of the rack 106, or a lower end plate 176 closely enough so that immersion of the rack 106 into the sump 168 generates hydraulic damping of the movement of the rack 106.

The linear mechanical actuator system 104 includes a pair of nested helical compression springs 178, 180 operatively positioned within the annular cavity in the bottom of the sump 168, below the lower end 134 of the rack 106, and configured for engaging and applying an upwardly-directed force to the lower plate 176 on the lower end 134 of the rack 106, when the lower end plate 176 comes into contact with a longitudinally movable spring contact plate 182 configured to rest on an upper end of the springs 178, 180 and move longitudinally along the inner tubular wall 170 as the springs 178, 180 act on the lower end 134 of the rack 106.

In certain embodiments, the springs 178, 180 are configured for engaging and applying an upwardly-directed force to the lower end 134 of the rack 106 only when the lower end 134 of the rack 106 has moved beyond a normal lower position of the rack 106 during a pump stroke. Such an arrangement provides a safety cushion to safely bring the rack 106 and rod string 82 (shown in FIG. 8) slowly to a halt in the event that a fault condition should result in the rack 106 moving downward to a longitudinal position lower than would be attained during a normal pump stroke. By virtue of this arrangement, a potentially damaging impact between components of the linear mechanical actuator system 104 and of the stationary and traveling valves 78, 80 members of the sucker-rod pump 68 (shown in FIG. 8) is precluded.

In other embodiments of the invention, however, the springs 178, 180 may be configured in such a manner that they engage and apply an upwardly-directed force to the lower end 134 of the rack 106 during a portion of each pump stroke 84 (shown in FIG. 8), to thereby recover a portion of the kinetic energy generated by the weight of the rod string 82 and sucker-rod pump 68 (shown in FIG. 8) during the downward portion of the pump stroke 84 under the force of gravity and utilize that stored energy in the springs 178, 180 for aiding the action of the linear rod pumping apparatus 100 during the upward portion of the stroke, in addition to precluding mechanical damage the rack 106 or other components at the bottom of each pump stroke 84.

Still referring to FIG. 5, a stationary position sensor 184 is disposed adjacent the rack 106 at a mid-stroke position along the pumping axis 120 in combination with upper and a lower sensor flags 186, 188 attached to the rack 106, respectively, at the upper and lower ends 136, 134 of the rack 106. The first and second sensor flags 186, 188 are positioned along the first leg 144 of the rack 106 in such a manner that the flags 186, 188 are brought into juxtaposition with, and sensed by, the sensor 184 during each complete pumping stroke.

The upper sensor flag 186 and lower sensor flag 188 are axially spaced from one another along the rack 186 to form a gap between the upper and lower flags 186, 188 with the gap being centrally and longitudinally disposed along the rack 106. The upper sensor flag 186 extends from the upper end 136 of the rack 106 to a lower edge 190 of the upper sensor flag 186, which defines an upper end of the gap between the upper and lower sensor flags 186, 188. The lower sensor flag 188 extends from the lower end of the rack 106 to an upper edge 192 of the lower sensor flag 188, to define the lower end of the gap between the upper and lower sensor flags 186, 188.

Figure 6:
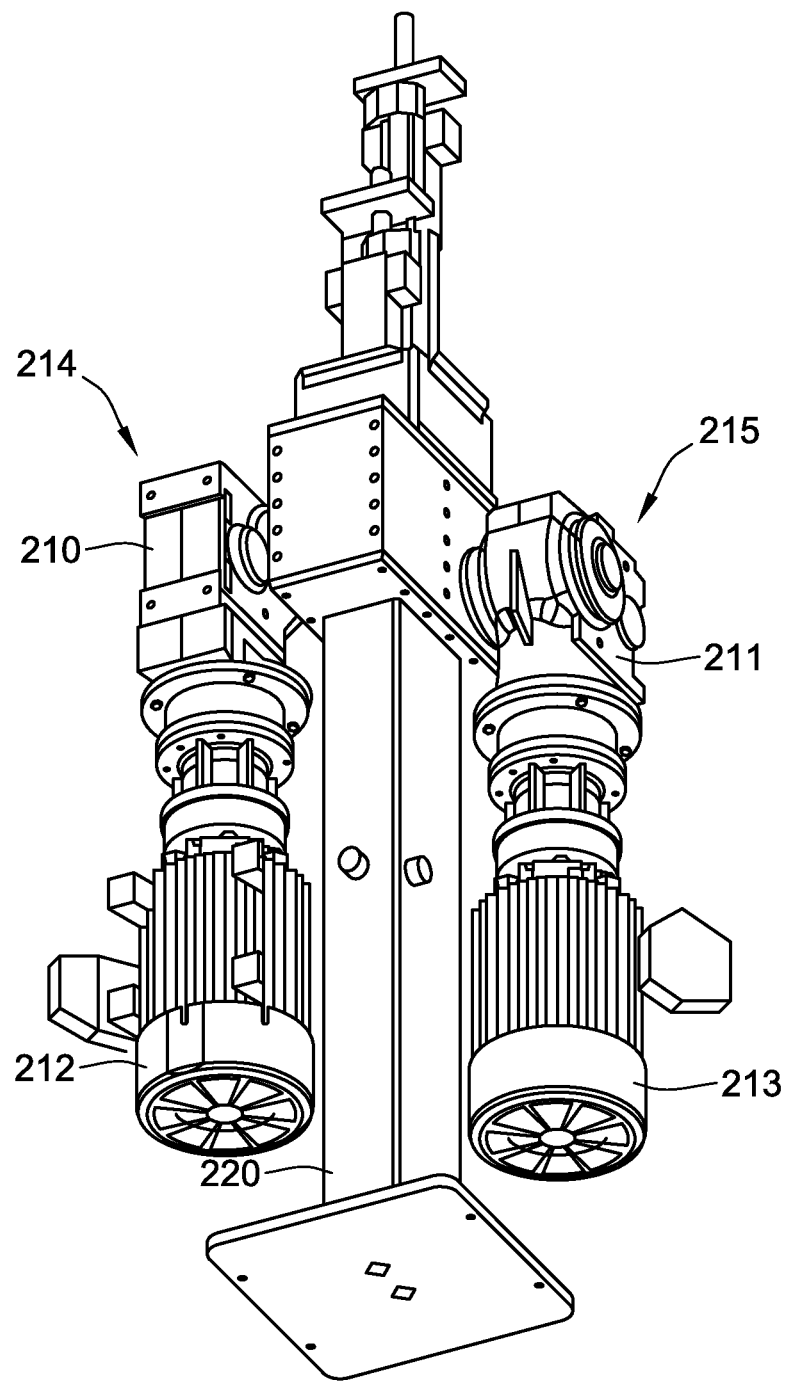
FIG. 6 is a perspective view of a dual completion linear rod pumping system, according to an embodiment of the invention.
Figure 7:
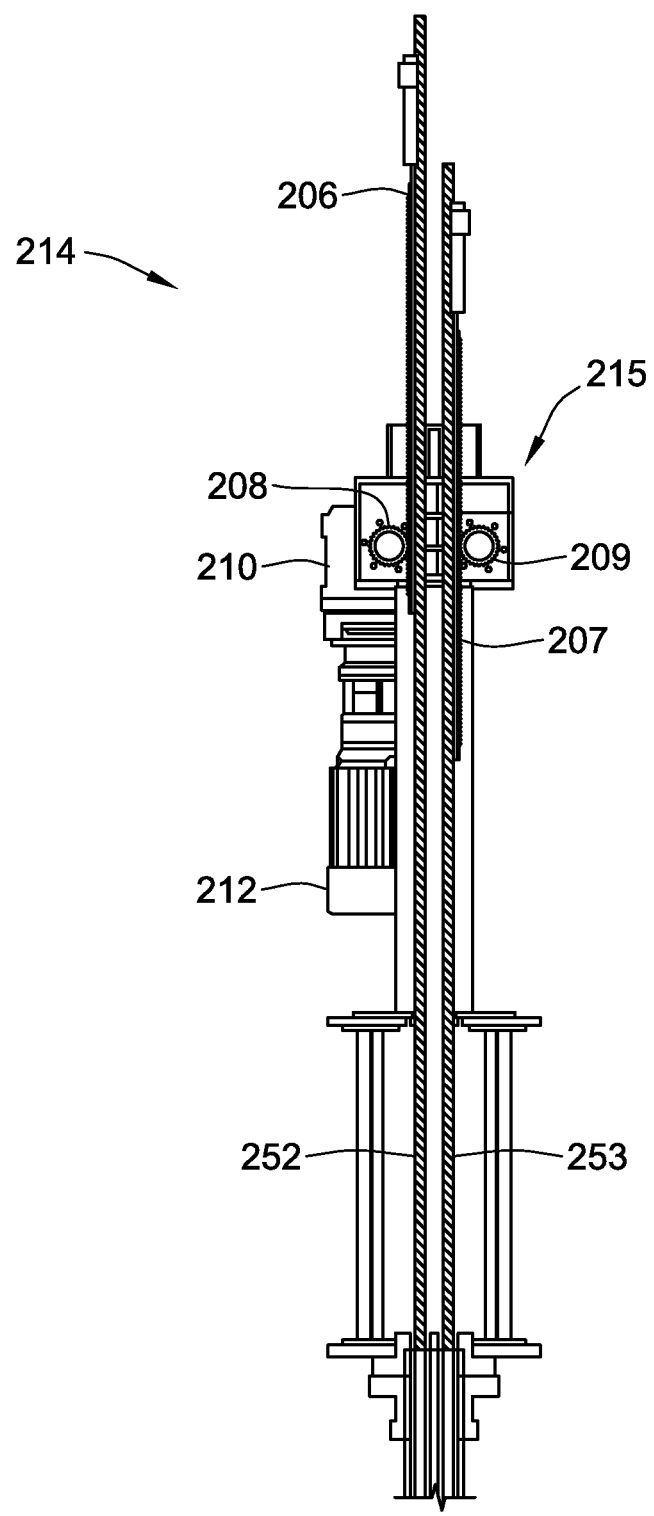
FIG. 7 is a cross sectional view of the dual completion linear rod pumping system, according to an embodiment of the invention.

FIGS. 6-7 illustrate an exemplary embodiment of a dual completion linear rod pumping system 200. As can be seen from the embodiments of FIGS. 6-7, the dual completion linear rod pumping system 200 includes first and second polished rods 252, 253 with respective first and second linear mechanical actuator systems 214, 215. The first and second polished rods 252, 253 are disposed in a single housing 220 and extend, in separate casings 60, down a single well/hole. In particular embodiments, the rods 252, 253 of the pair of rods are parallel to each other within the housing 220. In certain embodiments, the pair of rods 252, 253 is separated by no more than 6.86 inches (17.42 cm). More preferably, the pair of rods 252, 253 is separated by no more than 3.55 inches (9.02 cm) center-to-center.

As in the embodiments, described above, the first linear mechanical actuator system 214 has a first rack 206 and first pinion 208 operatively connected through a first gearbox 210, which is driven by a first reversible electric motor 212. The second linear mechanical actuator system 215 has a second rack 207 and second pinion 209 operatively connected through a second gearbox 211, which is driven by a second reversible electric motor 213. Each motor 212, 213 has a reversibly rotatable element operatively connected to the pinion 208, 209 which engages the rack 206, 207 to establish a fixed relationship between the rotational position of the pinion 208, 209 and the vertical position of the rack 206, 207. In certain embodiments of the invention, the first polished rod 252 is connected to a first downhole pump 68 (shown in FIG. 7), and the second polished rod 253 is connected to a second downhole pump 69 (shown in FIG. 7).

The arrangement of FIG. 6 allows for two drilling systems to operate simultaneously in roughly the same amount of space normally occupied by one drilling system. In operation, the dual completion linear rod pumping system 200 enables drillers to efficiently extract petroleum and hydrocarbons from the well, while separately extracting water which could be disposed in a layer just below the petroleum. This is possible because the two separate pumping systems can operate independently at different depths, in different completion zones, and at different pump rates.

With the dual pumping system arrangement shown in FIGS. 6-7, it is possible to operate the two systems independently without the use of clamps or cables to constrain the movement of the rods. Conventional systems employing rigid rods down-hole would likely require devices, such as the aforementioned clamps or cables, to ensure that the rods, or any devices connected thereto, do not collide or come into contact during pumping operations.

However, the use of a more flexible rods, such as first rod string 82 and second rod string 83 (shown in FIG. 8), each in conjunction with the linear rod pumping system described herein, permits the simultaneous pumping operation of both pumping systems without the added components required for rigid-rod pumping systems. Additionally, the independent operation of the pumping systems in the dual completion linear rod pumping system 200 means that the two motors 212, 213 can operate independently, and do not have to be synchronized to avoid interference or collisions between the two pumping systems.

FIG. 8 is a schematic illustration of an exemplary embodiment of the dual completion linear rod pumping apparatus 200 mounted on the well head 54 of a hydrocarbon well 56. The well includes a casing 60 which extends downward into the ground through a subterranean formation 62 to a depth sufficient to reach an oil reservoir 64. The casing 60 includes a series of perforations 66, through which fluid from the hydrocarbon reservoir enter into the casing 60, to thereby provide a source of fluid for a down-hole pumping apparatus 68, installed at the bottom of a length of tubing 70 which terminates in an fluid outlet 72 at a point above the surface 74 of the ground. The casing 60 terminates in a gas outlet 76 above the surface of the ground 74.

As shown in FIGS. 7 and 8, the dual completion linear rod pump apparatus 200, according to the invention, includes first and second linear mechanical actuator systems 214, 215 with a reversible motors 212, 213, an electronic controller 208 and a motor drive 210. In particular embodiments, the controller 208 has one or more sensors for sensing at least one of linear position of the rack 206, 207 along the pumping axis, rotational position of the pinion 208, 209 about the pinion axis, motor torque, motor speed, motor acceleration, and motor input power. Additionally, the sensors may be configured to sense a vertical position of each the two racks 206, 207 along a pumping axis 120 (shown in FIG. 5), and controlling the respective motors 212, 213 according to the sensed vertical positions.

The electronic controller 208 operates the motor 212, 213 in a driving mode to urge upward movement of the rack 206, 207 and of the polished rod 252, 253, and operates the motor 212, 213 in a braking mode during downward movement of the rack 206, 207 on a downward portion of the stroke of the polished rod 252, 253. In all forms of the invention, the linear mechanical actuator systems 214, 215 include a substantially vertically movable member, such as rack 206, 207 attached to the polished rod 252, 253 for imparting and controlling vertical motion of the rod string 82, 83 and the sucker-rod pump 68, 69. As stated above, in certain embodiments, the pair of rods 252, 253 is separated by no more than 6.86 inches (17.42 cm). More preferably, the pair of rods 252, 253 is separated by no more than 3.55 inches (9.02 cm) center-to-center. This center-to-center distance 89 is shown in FIG. 8.

In a certain embodiment, the rack 206 of the first linear mechanical actuator system 214 extends vertically, and the rack 207 of the second linear mechanical actuator system 215 extends vertically. In the embodiment shown, the two racks 206, 207 are parallel and disposed within the housing 220. Furthermore, the racks 206, 207 of the first and second linear mechanical actuator systems 214, 215 each have a plurality of vertically-adjacent teeth (clearly shown in FIGS. 2, 4 and 5) along one side of the rack 206, 207, the teeth of one rack 206 facing away from the other rack 207, and facing 180 degrees from the direction faced by the gears of the other rack 207.

In a further embodiment, the motor 212 of the first linear mechanical actuator system 214 is disposed on a first exterior side of the housing 220, and the motor 213 of the second linear mechanical actuator system 215 is disposed on a second exterior side of the housing 220 opposite the first exterior side.

In a particular embodiment, the fist down-hole pump 68 includes a stationary valve 78, and a traveling valve 80. The traveling valve 80 is attached to a rod string 82 extending upward through the tubing 70 and exiting the well head 54 at the polished rod 52. Those having skill in the art will recognize that the first down-hole pumping apparatus 68, in an exemplary embodiment of the invention, forms a traditional sucker-rod pump arrangement for lifting fluid from the bottom of the well 56 as the first polished rod 252 imparts reciprocal motion to first rod string 82, and the first rod string 82 in turn causes reciprocal motion of the traveling valve 80 through a pump stroke 84. In a typical hydrocarbon well, the rod string 82 may be several thousand feet, (i.e., several hundred or several thousand meters) long and the pump stroke 84 may be several feet (i.e., up to a meter or more) long.

In an exemplary hydrocarbon well such as shown in FIG. 8, there is a layer of water 65 below the oil reservoir 64. In such a well, trying to extract the oil with one down-hole pump often results in oil with a substantial amount of water. Separating the oil and water adds time and cost to the oil refining process. Embodiments of the dual completion linear rod pump apparatus 200, the first down-hole pump 68 at the end of the first rod string 82 is positioned in the oil reservoir 62, and operates at a first depth in a first completion zone.

The second down-hole pump 69 at the end of the second rod string 83 is positioned in the layer of water 65, and operates at a second depth lower than the first depth, and in a second completion zone different from the first completion zone. Simultaneous operations of the first and second down-hole pumps 68, 69 allows for separate extraction of the oil through the first down-hole pump 68, and of the water through the second down-hole pump 69.

The second down-hole pump 69 may be identical to the first down-hole pump 68, however, it is envisioned that the second down-hole pump 69 could be a different type of pump which is compatible with the components of the linear rod pumping apparatus.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

What is claimed is:

1. A dual completion linear rod pumping apparatus, for imparting reciprocating vertical motion to a pair of rods for respective sucker-rod pumps, the dual completion linear rod pumping apparatus comprising: first and second linear mechanical actuator systems for imparting and controlling vertical motion of the pair of rods, the first and second linear mechanical actuator systems constructed to operate within a single housing, each linear mechanical actuator system comprising: a rack and pinion gearing arrangement, the rack configured to impart a reciprocating motion along a pumping axis; the rack being operatively connected in a gear-mesh relationship with the pinion, the pinion being operatively connected to a rotating output of a motor, such that rotation of the motor in a first direction results in an upward motion of the rack along the pumping axis, and rotation of the motor in a second direction opposite the first direction results in a downward motion of the rack along the pumping axis, the rack also being operatively connected to the rod of the sucker-rod pump such that vertically-upward motion of the rack imparts a vertically-upward motion to the rod of the sucker-rod pump, and such that the rod of the sucker-rod pump exerts a vertically-downward-directed force on the rack, along the pumping axis, during a portion of a pump stroke; the motor having a reversibly rotatable element operatively connected to the pinion which engages the rack to establish a fixed relationship between the rotational position of the pinion and the vertical position of the rack; and an electronic controller operatively connected to the motor, for controlling the motor, wherein the electronic controller operates the motor in a driving mode to urge upward movement of the rack and of the rod, and operates the motor in a braking mode during downward movement of the rack on a downward portion of the stroke of the rod, the electronic controller including one or more sensors for sensing at least one of linear position of the rack along the pumping axis, rotational position of the pinion about the pinion axis, motor torque, motor speed, motor acceleration, and motor input power; wherein the pair of rods are parallel to each other within the housing; wherein the rack of the first linear mechanical actuator system extends vertically, and the rack of the second linear mechanical actuator system extends vertically, the two racks being parallel and disposed within the housing.

2. The dual completion linear rod pumping apparatus of claim 1, wherein the pair of rods is separated by no more than 6.86 inches (17.42 cm) center-to-center.

3. The dual completion linear rod pumping apparatus of claim 2, wherein the pair of rods is separated by no more than 3.55 inches (9.02 cm) center-to-center.

4. The dual completion linear rod pumping apparatus of claim 1, wherein the racks of the first and second linear mechanical actuator systems each have a plurality of vertically-adjacent teeth along one side of the rack, the teeth of one rack facing away from the other rack, and facing 180 degrees from a direction faced by the teeth of the other rack.

5. The dual completion linear rod pumping apparatus of claim 1, wherein the motor of the first linear mechanical actuator system is disposed on a first exterior side of the housing, and the motor of the second linear mechanical actuator system is disposed on a second exterior side of the housing opposite the first exterior side.

6. The dual completion linear rod pumping apparatus of claim 1, wherein the motor of the first linear mechanical actuator system operates independently of the motor of the second linear mechanical actuator system, and wherein a first sucker rod pump operates at a first depth in a first completion zone, and a second sucker rod pump operates at a second depth different from the first depth and in a second completion zone different from the first completion zone.

7. A method for operating a dual completion linear rod pumping apparatus that includes first and second linear mechanical actuator systems each having a motor, the apparatus further including first and second rods for respective first and second sucker rod pumps, the method comprising: constructing the first and second linear mechanical actuator systems to operate within a single housing; operating each of the motors in a manner that imparts reciprocating vertical motion to respective vertically movable members of the first and second linear mechanical actuator systems, each motor having a reversibly rotatable element that is operatively connected to the vertically movable member of its respective linear mechanical actuator system, thus establishing a fixed relationship between the rotational position of the rotatable element and the vertical position of the vertically movable member; wherein operating each of the motors comprises imparting reciprocating vertical motion to each rod of the first and second sucker-rod pumps; wherein operating each of the motors in a manner that imparts reciprocating vertical motion to respective vertically movable members of the first and second linear mechanical actuator systems comprises operating each of the motors in a manner that imparts reciprocating vertical motion to respective first and second racks of the first and second linear mechanical actuator systems, each rack extending vertically and including a plurality of vertically-adjacent teeth; the method further comprising aligning the first and second racks such that they are parallel to each other, and such that the teeth of the first rack faces a first direction, and the teeth of the second rack faces a second direction 180 degrees from the first direction.

8. The method of claim 7, further comprising:
    operating the motor of the first linear mechanical actuator system independently of the motor of the second linear mechanical actuator system; and
    operating the first sucker rod pump at a first depth in a first completion zone, and operating the second sucker rod pump at a second depth different from the first depth, and in a second completion zone different from the first completion zone.

9. The method of claim 8, further comprising independently controlling each motor in accordance with sensed values comprising at least one of linear position of the vertically movable member, rotational position of the rotatable element of the motor, motor torque, motor speed, motor acceleration, and motor input power.

10. The method of claim 7, further comprising:
    disposing the first rod of the first linear mechanical actuator system, and the second rod of the second linear mechanical actuator system, within the housing; and
    aligning the first and second rods such that they are parallel to each other.

11. The method of claim 10, further comprising separating the first and second rods by no more than 3.55 inches (9.02 cm) center-to-center.

12. The method of claim 7, further comprising sensing vertical position of each of the first and second racks along a pumping axis, and controlling the respective motors according to the sensed vertical positions.

13. The method of claim 7, further comprising disposing the motor of the first linear mechanical actuator system on a first exterior side of the housing, and disposing the motor of the second linear mechanical actuator system on a second exterior side of the housing opposite the first exterior side.

* * * * *